United States Patent [19]
Tu

[11] 4,364,847
[45] Dec. 21, 1982

[54] PASSIVATION OF METAL CONTAMINANTS ON CRACKING CATALYST WITH A LITHIUM COMPOUND

[75] Inventor: Hosheng Tu, Lake Forest, Calif.

[73] Assignee: UOP Inc., Des Plaines, Ill.

[21] Appl. No.: 266,764

[22] Filed: May 26, 1981

Related U.S. Application Data

[63] Continuation-in-part of Ser. No. 124,507, Feb. 25, 1980, abandoned.

[51] Int. Cl.$^3$ .................. B01J 29/38; B01J 21/20; C10G 11/18; C10G 11/05
[52] U.S. Cl. .................. 252/412; 208/52 CT; 208/113; 208/120; 252/414; 252/417
[58] Field of Search .................. 252/411 R, 412, 414, 252/416, 417; 208/52 CT, 113, 120

[56] References Cited

U.S. PATENT DOCUMENTS

| | | | |
|---|---|---|---|
| 2,480,627 | 8/1949 | Bodkin et al. | 252/412 |
| 2,758,097 | 8/1956 | Doherty et al. | 252/413 |
| 2,981,676 | 4/1961 | Adams et al. | 208/120 |
| 3,252,918 | 5/1966 | Disegna et al. | 252/416 |
| 3,324,044 | 6/1967 | Oberhofer | 252/413 |
| 3,409,541 | 11/1968 | Flanders et al. | 208/120 |
| 3,696,025 | 10/1972 | Chessmore et al. | 252/417 |
| 3,711,422 | 1/1973 | Johnson et al. | 252/414 |
| 4,013,546 | 3/1977 | Suggitt et al. | 252/415 |
| 4,014,815 | 3/1977 | Gamble, Jr. et al. | 252/412 |
| 4,025,458 | 5/1977 | McKay | 252/416 |
| 4,192,770 | 3/1980 | Singleton | 252/414 |
| 4,244,810 | 1/1981 | Youngblood et al. | 252/417 |

Primary Examiner—P. E. Konopka
Attorney, Agent, or Firm—James R. Hoatson, Jr.; Louis A. Morris; William H. Page, II

[57] ABSTRACT

A contaminating metal on cracking catalyst used for the cracking of hydrocarbons is passivated by contacting the catalyst with a lithium compound at passivation reaction conditions. The passivation may be effected in a separate passivation zone with an aqueous solution of a water soluble lithium compound or in the cracking zone by dissolving an oil soluble lithium compound in the feedstock. The amount of lithium deposited on the catalyst is from about 0.5 wt. % to about 1.25 wt. % on an elemental basis.

11 Claims, No Drawings

PASSIVATION OF METAL CONTAMINANTS ON CRACKING CATALYST WITH A LITHIUM COMPOUND

CROSS-REFERENCE TO RELATED APPLICATION

This application is a continuation-in-part of prior and now abandoned copending application Ser. No. 124,507, filed Feb. 25, 1980, incorporated herein by reference.

BACKGROUND OF THE INVENTION

1. Field of the Invention

The field of art which the claimed invention pertains is the catalytic cracking of hydrocarbons. More specifically, the claimed invention relates to a process for the passivation of contaminating metals on a fluidized cracking catalyst.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

A common problem in the fluid catalytic cracking process is the gradual deterioration of the catalyst due to the deposition on the catalyst of metal contaminants contained in the hydrocarbon feed, such as nickel, vanadium and iron. These deposited metal contaminants increase the production of hydrogen, undesired light gases and coke at the expense of the highly desirable gasoline. A further disadvantage of high hydrogen and light gas yield is that a larger capitol investment is required in equipment needed to deal with the large volume of gases.

The art teaches many techniques for dealing with these undesirable metal contaminants. Such techniques can be divided into two broad categories, one being the passivation of the contaminants by reacting the catalyst with a passivating agent, which converts the metal contaminants to a relatively innocuous form, and the other being the physical removal of the contaminants from the catalyst. Examples of techniques falling within the former category are as taught or claimed in U.S. patent publication Nos. 2,758,097 (reaction with phosphorous pentoxide); 3,711,422 (reaction with an antimony compound); and 4,025,458 (reaction with chemical complexes containing antimony). Examples of techniques falling within the latter category are as taught or claimed in U.S. patent publication Nos. 3,252,918; 3,324,044; 4,013,546; and 4,014,815.

U.S. patent publication No. 2,981,676 discloses that a metals contaminated cracking catalyst can have its activity and selectivity improved by adding to it at appropriate conditions a small amount of alkali or alkaline earth metal oxide. The preferred amount is stated to be between about 0.05% and 0.5% by weight. This reference warns against an alkali concentration above about 0.5 wt. percent because of concentrations that high being "known to adversely affect the activity and selectivity of cracking catalysts".

I have found a process for passivating an undesired metal contaminant on a fluid cracking catalyst for use in a fluidized cracking system by reaction with a lithium compound in concentrations for exceeding the ranges heretofore thought practicable for alkali metals.

SUMMARY OF THE INVENTION

It is, accordingly, a broad objective of my invention to achieve passivation of undesired metal contaminants on a fluid catalytic cracking catalyst.

In brief summary, my invention is a process for passivating a metal on a fluidized cracking catalyst which has been contaminated with that metal due to the use of the catalyst in a fluidized cracking system. The catalyst is cycled between a cracking zone, in which the catalyst is contacted at an elevated temperature with a hydrocarbon feedstock containing the metal contaminant which deposits on the catalyst, and a regeneration zone, in which carbon is oxidized and thereby removed from the catalyst. The process comprises contacting at least a portion of the catalyst at passivation reaction conditions with a lithium compound so as to effect a passivation reaction between the metal and the lithium compound thereby effecting the passivation of the metal contaminant.

Other objectives and embodiments of my invention encompass details about catalyst composition, flow schemes, and passivation reaction conditions, all of which are hereinafter disclosed in the following discussion of each of the facets of my invention.

DESCRIPTION OF THE INVENTION

Catalysts which can be used in the process of this invention include those known to the art as fluidized catalytic cracking catalysts. Specifically, the high activity aluminosilicate or zeolite containing catalysts can be used and are preferred because of their higher resistance to the deactivating effects of high temperatures, exposure to steam, and exposure to metals contained in the feedstock. The well known amorphous silica alumina catalysts may also be used.

Charge stocks used in the catalytic cracking process are mentioned here because contaminant metals such as nickel, iron, vanadium and copper found in the charge stock usually influence the regeneration operation, catalyst selectivity, catalyst activity and the fresh catalyst makeup rate required to maintain a constant activity. Metals contained in the feed are deposited on the catalyst and not only change its selectivity in the direction of less gasoline and more coke and light gas in a given reactor system but tend to deactivate the catalyst.

In a typical FCC process flow, finely divided regenerated catalyst leaves the regeneration zone at a certain temperature and contacts a feedstock in a lower portion of a reaction riser zone. While the resulting mixture, passes up through the riser, conversion of the feed to lighter products occurs and coke is deposited on the catalyst. Reaction conditions are a temperature of from about 450° C. to about 570° C. and a pressure of from about atmospheric to about 25 psig. The effluent from the riser is discharged into a disengaging space where additional conversion can take place. The hydrocarbon vapors, containing entrained catalyst, are then passed through one more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, contacts the spent catalyst purging adsorbed and interstitial hydrocarbons from the catalyst. The spent catalyst containing coke leaves the stripping zone and passes into a regenerating zone, where, in the presence of fresh regeneration gas and at a temperature of from about 620° C. to about 760° C., combination of coke produces regenerated catalyst and flue gas containing carbon monoxide, carbon dioxide, water, nitrogen and perhaps a small quantity of oxygen. Usually, the fresh regeneration gas is air, but it could be air either enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and, as previously mentioned, contacts the feedstock in a reaction zone.

One of the major obstacles in the processing of FCC feedstocks, such as residual stocks, which are contaminated with the aforementioned undesirable metal contaminants, is the harmful influence of even minute amounts of these metals. These metals, and in particular nickel, will contribute a dehydrogenating activity to the catalyst on which they deposit which is responsible for the production of additional hydrogen and coke on the catalyst. The presence of large quantities of these metals also blocks access to cracking sites and can lower the activity of the catalyst.

While it would be ideal to remove these contaminants, such procedures may be quite elaborate and expensive. A simpler approach is to neutralize or passify the metals present on the catalyst. Such a procedure does not necessarily restore the full clean catalyst activity (since metals still block a percentage of the catalytic sites), but is quite helpful in lowering hydrogen gas production which can overload gas compressors and in resulting coke on the catalyst from active metal influences.

I have found that contacting the fluid cracking catalyst with a lithium compound will effect a substantial lessening in the formation of hydrogen and other light gases in the catalytic reactors. The lithium may be introduced in the form of an aqueous solution of a water soluble lithium compound, such as lithium acetate, lithium nitrate, lithium chloride, lithium benzoate, lithium carbonate and/or lithium metaborate. In that case the invention would be implemented by obtaining a portion (slipstream) of regenerated catalyst prior to its introduction into the FCC reactors (for example, from the dipleg between the regenerator and reactor vessels), cooling and contacting that portion with the solution. The contacting may be effected batchwise, whereby a quantity of catalyst would be placed in a container, impregnated with the solution, dried and calcined. The contacting could be effected continuously by maintaining a downwardly flowing catalyst bed in a vertical column and percolating the solution through the bed while continuously drying and calcining the catalyst as it is removed from the bottom of the column.

The lithium, in a preferred embodiment, could also be contacted with the catalyst in the form of an oil soluble compound added to the feedstock. The oil soluble compound would decompose and lithium would be incorporated in the FCC catalyst as a passivating agent in the cracking zone. Examples of suitable oil soluble lithium compounds are lithium phenylacetylide; lithium 2,4-pentanedionate; and lithium cyclohexanebutyrate.

Passivation reaction conditions are conditions which effect decomposition of the lithium compound used and combination of some form of lithium, such as lithium oxide, with the contaminating metals. When the lithium compound used is water soluble and contacted with the catalyst, either batchwise or continuous, in an aqueous solution, the catalyst must first be cooled from the very high regenerator temperature at which it is acquired to less than about 100° C. to enable impregnation of the catalyst without immediately boiling away the water. Following impregnation, the catalyst is dried by evaporating off the water by conventional means usually involving the application of the boiling point temperature at the pressure used in the evaporation which could vary from a strong vacuum to ambient pressure. Following drying, the catalyst is calcined at about ambient pressure and a temperature from about 425° C. to about 815° C. for at least one-half of an hour. After being calcined the passivated catalyst is added to the catalyst being cycled back to the reaction zone.

When the lithium compound used is oil soluble and contacted with the catalyst by being added to the feedstock, the passivation reaction conditions would be the aforementioned conditions that occur in the reaction zone.

The amount of lithium deposited on the catalyst is desirably such as to overcome the poisoning effects of the metal contaminant. I have found that, contrary to the admonitions of the aforementioned prior art, the amount of lithium to be deposited on the catalyst should be from about 0.5 wt. % to about 1.25 wt. % on an elemental basis, which in terms of lithium oxide would be from about 1.08 wt. % to about 2.69 wt. %.

Without being limited by any theory, I believe that my invention renders the metal contaminants inactive by effecting a chemical combination of the contaminants with some form of the lithium, e.g. lithium oxide. This postulation finds support in the fact that the treated catalyst show lower hydrogen yield than untreated (control) catalyst.

The following non-limiting examples are illustrative of the process of my invention.

EXAMPLE I

This example describes the treatment of a metal contaminated catalyst in accordance with the process of the present invention.

A commercial FCC equilibrium catalyst was impregnated with nickel to obtain a simulated metal contaminated catalyst for use as a control. The impregnation was carried out in a conventional manner with an aqueous solution of a nickel salt. The catalyst, after drying, contained 0.25 wt. % nickel.

The control catalyst after calcining at 732° C. for two hours to simulate passage through an FCC regenerating zone was subjected to the following procedure in accordance with an embodiment of the present invention:

1. 100 grams of catalyst were loaded into a rotating steam jacketed glass evaporator;
2. 200 cc of a solution of 18.54 grams of lithium benzoate in deionized water was added to the evaporator;
3. The evaporator was rotated for one hour without application of steam;
4. Steam was cut in and the evaporator rotated for three hours; and
5. The catalyst was unloaded from the evaporator into a muffle oven where it was heated at 732° C. or two hours.

The catalyst after recovery and cooling following step 5 comprised a metal contaminated catalyst passivated in accordance with the process of the present invention and having about 1.00 wt. % lithium deposited thereon.

EXAMPLE II

This example sets forth the results of comparative testing in an FCC pilot plant of the control FCC catalyst and the catalyst of Example I, passivated in accordance with the process of the present invention.

The pilot plant, for each test run was loaded with 4.0 grams of the catalyst being tested. The feedstock was vacuum gas oil, with 1.28 grams charged during each run. The reaction zone temperature was 482° C. during both runs. Following are the results:

| Catalyst | Control | Li Treated |
|---|---|---|
| Production Distribution (Wt. % of Product) | | |
| Hydrogen | 0.83 | 0.57 |
| Methane | 0.39 | 0.31 |
| $C_2$ Total | 0.76 | 0.46 |
| $C_3$ Total | 4.69 | 4.09 |
| $C_4$ Total | 11.03 | 9.86 |
| $C_5$ to EP Gasoline | 76.45 | 78.63 |
| Spent Catalyst Carbon | 5.85 | 6.08 |
| Wt. % Conversion of Feed to 232° C. Final Boiling Point | 75.19 | 61.24 |
| Dry Gas Yield $C_2$—, scf/bbl | 427 | 243 |
| Hydrogen Yield, scf/bbl | 380 | 217 |
| Hydrogen to Methane Mole Ratio | 17.1 | 14.9 |

It may be first noted from the above data that the lithium impregnation results in a decrease in weight percent conversion, which, in the light of the hereinafter discussed change in product distribution, is indicative of the reduction of undesired nickel activity. In other words, the lithium has selectively passivated the nickel poison.

The change in product distribution achieved by the process of the present invention is remarkable. Particular attention is drawn to dry gas yield ($C_2$—fraction), hydrogen yield and hydrogen to methane mole ratio, all three of which are directly proportional and indicative of metals contamination in an FCC reactor. In this example, all three values were substantially reduced as a result of lithium incorporation. The yields of relatively undesirable hydrogen, methane, $C_2$ total, $C_3$ total, and $C_4$ total are all reduced by my invention, while the yield of the highly desirable $C_5$ to EP gasoline is significantly increased.

I claim as my invention:

1. A process for passivating a metal on fluidized cracking catalyst which has been contaminated with said metal due to the use of said catalyst in a fluidized cracking system and wherein said catalyst is cycled between a cracking zone, in which said catalyst is contacted at an elevated temperature with a hydrocarbon feedstock containing said metal contaminant which deposits on said catalyst, and a regeneration zone, in which carbon is oxidized and thereby removed from said catalyst, which process comprises contacting at least a portion of said catalyst at passivation reaction conditions with a lithium compound in an amount to deposit on the catalyst about 0.5 wt % to 1.25 wt % lithium on an elemental metal basis, to effect a passivation reaction between said metal and said lithium and the passivation of said metal contaminant so as to increase yield of $C_5$+ and reduce the yield of hydrogen in said fluidized cracking system.

2. A process in accordance with claim 1 wherein said catalyst comprises alumina.

3. A process in accordance with claim 1 wherein said catalyst comprises crystalline aluminosilicate.

4. A process in accordance with claim 1 wherein said contacting of said catalyst with said lithium compound occurs in a passivation zone with said catalyst being cycled from said regeneration zone to said passivation zone and from said passivation zone to said cracking zone.

5. A process in accordance with claim 4 wherein said lithium compound is water soluble and contained in an aqueous solution, said catalyst being impregnated and thereby passivated with said compound by contact of said solution with said catalyst.

6. A process in accordance with claim 5 wherein said lithium compound comprises one or more compounds included in the group comprising lithium acetate, lithium nitrate, lithium chloride, lithium benzoate, lithium carbonate or lithium metaborate.

7. A process in accordance with claim 5 wherein said contact of said portion of said catalyst and said solution is carried out batchwise.

8. A process in accordance with claim 5 wherein said contact is carried out by continuous percolation of said solution through a bed comprising said portion of said catalyst.

9. A process in accordance with claim 1 wherein said lithium compound is oil soluble and is added to the feedstock of said cracking system thereby effecting contact of said catalyst with said lithium compound and passivation of said metal contaminants occurs in said cracking zone.

10. A process in accordance with claim 9 wherein said lithium compound comprises one or more compounds selected from the group consisting of lithium phenylacetylide; lithium 2,4-pentanedionate; and lithium cyclohexanebutyrate.

11. A process in accordance with claim 1 wherein said metal contaminant is included in the group comprising nickel, vanadium, iron or copper.

* * * * *